US011353677B2

(12) United States Patent
Gao

(10) Patent No.: US 11,353,677 B2
(45) Date of Patent: Jun. 7, 2022

(54) LENS MODULE

(71) Applicant: AAC Optics Solutions Pte. Ltd., Singapore (SG)

(72) Inventor: Yuchan Gao, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 8 days.

(21) Appl. No.: 16/987,418

(22) Filed: Aug. 7, 2020

(65) Prior Publication Data
US 2021/0048598 A1   Feb. 18, 2021

(30) Foreign Application Priority Data

Aug. 15, 2019   (CN) .......................... 201921329573.3

(51) Int. Cl.
*G02B 7/02*    (2021.01)
*G02B 13/00*   (2006.01)

(52) U.S. Cl.
CPC ............. *G02B 7/025* (2013.01); *G02B 7/021* (2013.01); *G02B 13/004* (2013.01)

(58) Field of Classification Search
CPC .......... G02B 7/02; G02B 7/021; G02B 7/022; G02B 7/023; G02B 7/025; G02B 7/026; G02B 7/027; G02B 7/003; G02B 7/04; G02B 13/0015; G02B 13/0045; H04N 5/2254; H04N 5/2257; H04N 5/2253; H04N 5/225
See application file for complete search history.

(56) References Cited

U.S. PATENT DOCUMENTS

| | | | |
|---|---|---|---|
| 2012/0147489 A1* | 6/2012 | Matsuoka | G02B 7/025 359/819 |
| 2012/0162795 A1* | 6/2012 | Yoshimura | G02B 13/004 359/830 |
| 2015/0219871 A1* | 8/2015 | Kim | G02B 7/021 359/793 |
| 2017/0003473 A1* | 1/2017 | Zhan | G02B 7/021 |
| 2018/0024308 A1* | 1/2018 | Wei | G02B 7/021 359/819 |
| 2019/0187340 A1* | 6/2019 | Jheng | G02B 7/021 |
| 2020/0073077 A1* | 3/2020 | Kanzaki | G02B 7/022 |
| 2020/0158982 A1* | 5/2020 | Feng | G02B 7/026 |
| 2021/0352196 A1* | 11/2021 | Chen | G02B 7/022 |

* cited by examiner

*Primary Examiner* — Ephrem Z Mebrahtu
(74) *Attorney, Agent, or Firm* — W&G Law Group

(57) ABSTRACT

Provided is a lens module, including a lens barrel, a first lens and a spacing ring. The lens barrel includes a first barrel wall hole and a second barrel wall extending from the first barrel wall while being bent. The first lens includes a bearing portion. The spacing ring abuts against an inner wall of the second barrel wall. The bearing portion of the first lens is fixedly connected to an image side surface of the spacing ring and an image side surface of the second barrel wall. An adhesive groove is formed at a position where the first lens is connected to the spacing ring and the second barrel wall. The lens module according to the present invention is stable and reliable, and has a smaller contour dimension, a smaller overall length, and an increased mechanical back focal length.

5 Claims, 3 Drawing Sheets

LENS MODULE

TECHNICAL FIELD

The present invention relates to the technical field of optical imaging, and more particularly, to a lens module.

BACKGROUND

In recent years, with development of imaging technologies and rise of electronic products having imaging functions, optical imaging modules have been widely applied in various products. In order to follow a current trend of smaller electronic products, a dimension of the lens module shall develop towards microminiaturization.

In the related art, the lens module includes a lens barrel, and a first lens and a spacing ring that are sequentially arranged along a direction from an image side of the lens barrel towards an object side of the lens barrel, and the lens barrel includes a first barrel wall provided with an light-through hole and a second barrel wall extending from the first barrel wall while being bent.

However, for the lens module in the related art, the first lens and the spacing ring are usually received in the second barrel wall. In an installation process of the lens module in the related art, the spacing ring and the first lens are usually placed in the second barrel wall in sequence, then a pressing ring is used to press the first lens to fix the first lens by adhesive dispensing. In this case, the pressing ring limits a height and a back focal length of the lens.

Therefore, in view of the defect in the related art that the pressing ring limits the height and the back focal length of the lens, it is needed to provide a new lens module, which is stable and reliable and can have a smaller dimension, a shorter overall length and an increased mechanical back focal length, in order to solve the above-mentioned problems.

SUMMARY

The technical problem to be solved by present invention lies in the defect in the related art that the pressing ring of the lens module limits the height and the back focal length of the lens. The present invention provides a new lens module, which is stable and reliable, and can have a smaller dimension, a shorter overall length, and an increased mechanical back focal length.

A lens module is provided, including: a lens barrel, and a first lens and a spacing ring that are sequentially arranged along a direction from an image side of the lens barrel towards an object side of the lens barrel. The lens barrel includes a first barrel wall provided with a light-through hole and a second barrel wall extending from the first barrel wall while being bent. The first lens includes a body portion serving as an imaging region and a bearing portion extending from a periphery of the body portion. The spacing ring is received in the lens barrel, the spacing ring abuts against an inner wall of the second barrel wall, the bearing portion of the first lens is fixedly connected to an image side surface of the spacing ring and an image side surface of the second barrel wall, and an adhesive groove is formed at a position where the first lens is connected to the spacing ring and the second barrel wall.

As an improvement, the spacing ring includes a first surface extending from the image side surface thereof to an object side thereof and obliquely towards the second barrel wall, the second barrel wall includes a second surface extending from the image side surface thereof to the object side and obliquely towards the spacing ring, the first surface and the second surface together form an adhesive dispensing groove; an object side surface of the bearing portion is provided with a plurality of grooves spaced from each other, and the plurality of grooves together forms a jagged adhesive receiving groove; and the adhesive dispensing groove and the adhesive receiving groove together form the adhesive groove.

As an improvement, the image side surface of the spacing ring and the image side surface of the second barrel wall are coplanar.

As an improvement, the adhesive groove is filled with a shadowless adhesive; ultraviolet light passes through the first lens to cure the shadowless adhesive, and the shadowless adhesive adheres and fixes the first lens to the spacing ring and the second barrel wall.

Compared with the related art, for the lens module provided by the present invention, the first lens is fixed and connected to the image side surface of the second barrel wall, so that the first lens does not cooperate with the inner wall of the lens barrel. Therefore, the contour dimension of the lens module can be made smaller. The first lens is directly adhered to the lens barrel, so that the lens module does not need a pressing ring for fixing, which is beneficial to reduce the overall length of the lens module and increase the mechanical back focal length. The jagged adhesive groove is formed at a position where the first lens is connected to the spacing ring and the second barrel wall, so that the adhesive area is effectively increased, which is beneficial to improving stability and reliability of the lens module.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

In order to make the purpose, technical solutions, and advantages of the embodiments of the present invention be understandable, the technical solutions in the embodiments of the present invention are described in the following with reference to the accompanying drawings. It should be understood that the described embodiments are merely exemplary embodiments of the present invention, which shall not be interpreted as providing limitations to the present invention. All other embodiments obtained by those skilled in the art without creative efforts according to the embodiments of the present invention are within the scope of the present invention.

Figure 1:
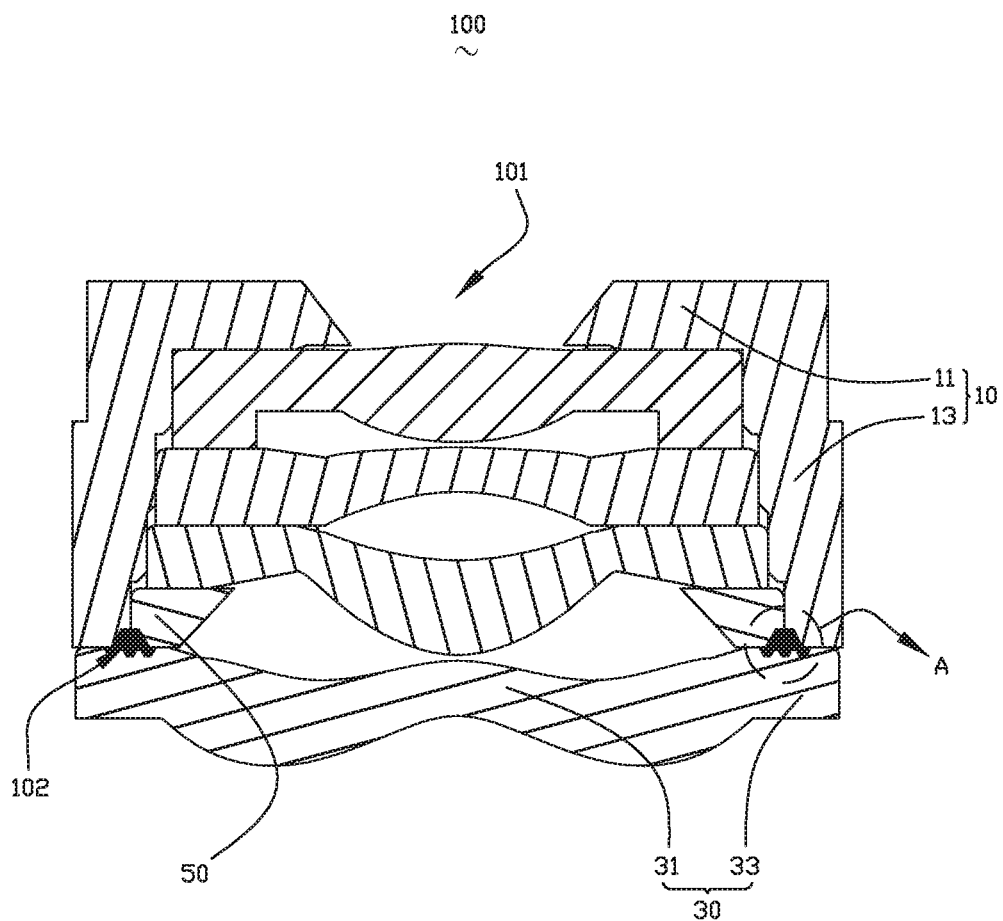
FIG. 1 is a schematic plan view of a structure of a lens module according to the present invention.
Figure 2:
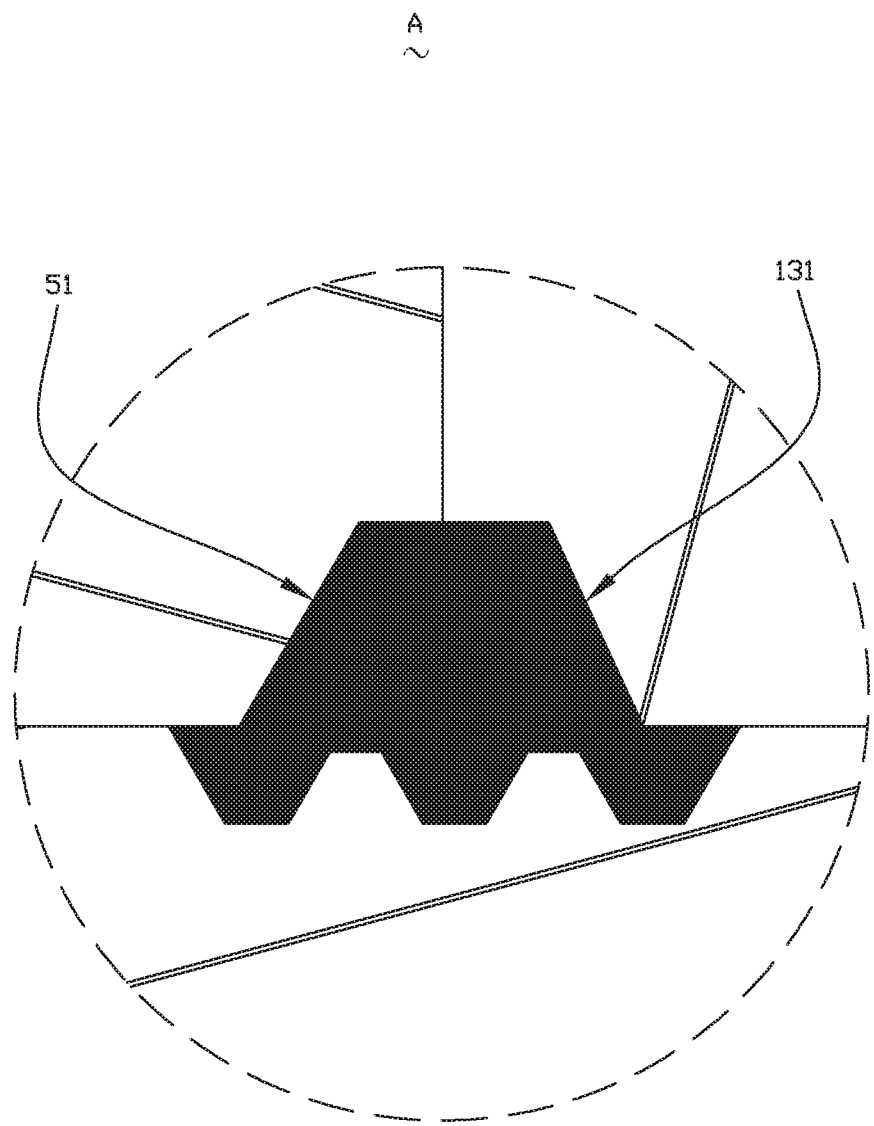
FIG. 2 is an enlarged view of part A of the lens module shown in FIG. 1.
Figure 3:
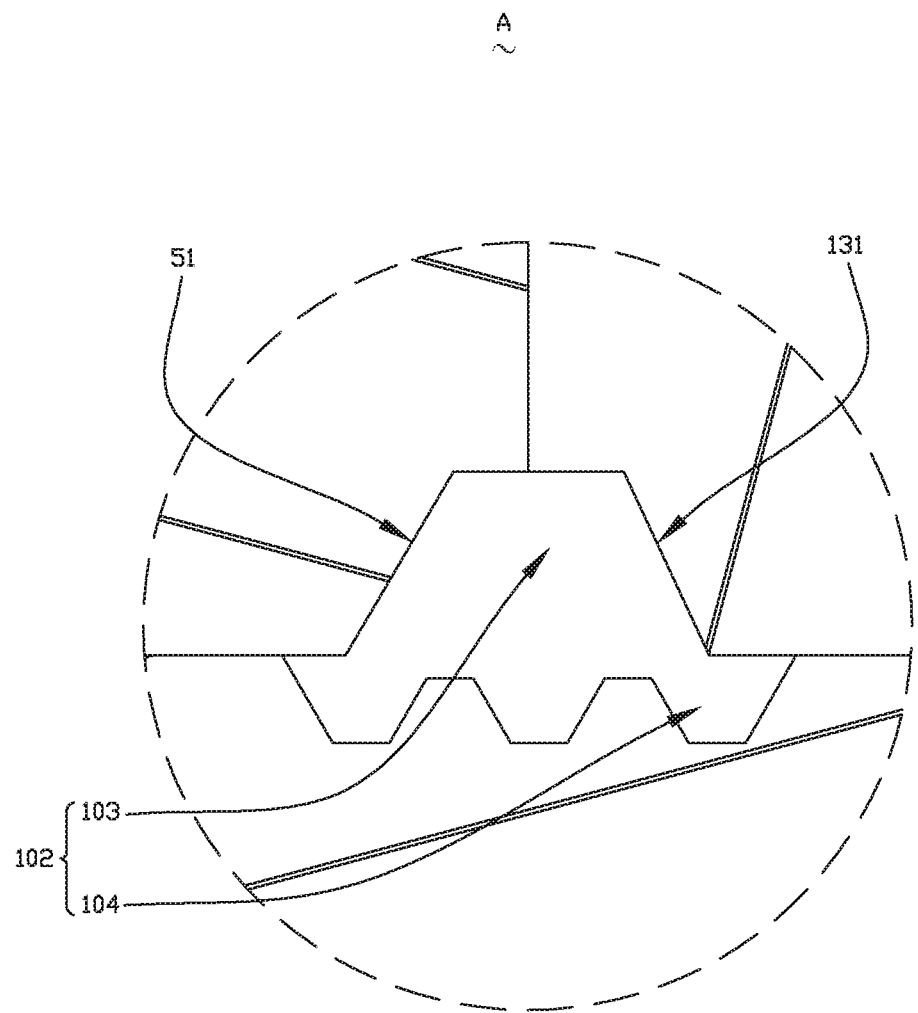
FIG. 3 is a schematic diagram of the lens module shown in FIG. 2 after removing an adhesive.

In combination with to FIG. 1 and FIG. 3, the present invention provides a lens module 100 including a lens barrel 10, and a first lens 30 and a spacing ring 50 that are sequentially arranged along a direction from an image side of the lens barrel 10 towards an object side of the lens barrel 10. The spacing ring 50 is received in the lens barrel 10, and the first lens 30 is fixedly connected to an image side surface of the spacing ring 50 and an image side surface of the lens barrel 10.

The lens barrel 10 includes a first barrel wall 11 provided with a light-through hole 101 and a second barrel wall 13 extending from the first barrel wall 11 while being bent. The first lens 30 is fixedly connected to the image side surface of the spacing ring 50 and an image side surface of the second barrel wall 13, and a jagged adhesive groove 102 is formed at a position where the first lens 30 is connected to the spacing ring 50 and the second barrel wall 13.

The first lens 30 is fixedly connected to the image side surface of the second barrel wall 13, so that the first lens 30 does not cooperate with an inner wall of the lens barrel 10. Therefore, a contour dimension of the lens module 100 can be smaller. Moreover, the first lens 30 is directly adhered to the lens barrel 10, so that the lens module 100 does not need a pressing ring for fixing, which facilitates reducing an overall length of the lens module 100 and increasing a mechanical back focal length.

The spacing ring 50 abuts against the inner wall of the second barrel wall 13. For example, the spacing ring 50 includes a first surface 51 extending from the image side surface of the spacing ring 50 to the object side thereof and obliquely towards the second barrel wall 13. The second barrel wall 13 includes a second surface 131 extending from the image side surface of the second barrel wall 13 to the object side thereof and obliquely towards the spacing ring 50. The first surface 51 and the second surface 131 together form an adhesive dispensing groove 103.

The first lens 30 includes a body portion 31 serving as an imaging region and a bearing portion 33 extending from a periphery of the body portion 31, and the groove is arranged at the bearing portion 33.

An object side surface of the bearing portion 33 is provided with a plurality of grooves spaced from each other, and the plurality of grooves together forms a jagged adhesive receiving groove 104. The adhesive receiving groove 104 and the adhesive dispensing groove 103 together form the adhesive groove 102.

The adhesive receiving groove 104 is formed by a plurality of grooves, so that an adhesive area is effectively increased, thereby facilitating improving stability and reliability of the lens module 100.

In an example, the image side surface of the spacing ring 50 and the image side surface of the second barrel wall 13 are coplanar.

The first lens 30 is made of a transparent material, and the adhesive groove 102 is filled with a shadowless adhesive. Ultraviolet light passes through the first lens 30 to cure the shadowless adhesive, which in turn adheres and fixes the first lens 30 to the spacing ring 50 and the second barrel wall 13.

An installation process of the lens module 100 provided by present invention will be described as follows.

At a first step, the spacing ring 50 is placed into the lens barrel 10, and the image side surface of the spacing ring 50 is aligned with the image side surface of the second barrel wall 13.

At a second step, the adhesive dispensing groove 103 defined by the first surface 51 and the second surface 131 is filled with the shadowless adhesive.

At a third step, the first lens 30 is installed, an eccentricity is adjusted in such a manner that the adhesive receiving groove 104 and the adhesive dispensing groove 103 together form the adhesive groove 102, and the adhesive groove 102 is filled with the shadowless adhesive.

At a fourth step, ultraviolet light is provided, and the ultraviolet light gets into the adhesive groove 102 after passing through the first lens 30, so as to cure the shadowless adhesive in the adhesive groove 102.

Compared with the related art, for the lens module 100 provided by the present invention, the first lens 30 is fixedly connected to the image side surface of the second barrel wall 13, so that the first lens 30 does not cooperate with the inner wall of the lens barrel 10. Therefore, the contour dimension of the lens module 100 can be smaller. The first lens 30 is directly adhered to the lens barrel 10, so that the lens module 100 does not need a pressing ring for fixing, which facilitates reducing the overall length of the lens module 100 and increase the mechanical back focal length. The jagged adhesive groove 102 is formed at a position where the first lens 30 is connected to the spacing ring 50 and the second barrel wall 13, so that the adhesive area is effectively increased, which facilitates improving stability and reliability of the lens module 100.

The above description merely illustrates some embodiments of the present invention. It should be noted that those skilled in the art can make improvements without departing from a creative concept of the present invention, and all these improvements shall fall into a protection scope of the present invention.

What is claimed is:

1. A lens module, comprising:
   a lens barrel, and
   a first lens and a spacing ring that are sequentially arranged along a direction from an image side of the lens barrel towards an object side of the lens barrel,
   wherein the lens barrel comprises a first barrel wall provided with a light-through hole and a second barrel wall extending from the first barrel wall while being bent;
   wherein the first lens comprises a body portion serving as an imaging region and a bearing portion extending from a periphery of the body portion;
   wherein the spacing ring is received in the lens barrel, the spacing ring abuts against an inner wall of the second barrel wall, the bearing portion of the first lens is fixedly connected to an image side surface of the spacing ring and an image side surface of the second barrel wall, and an adhesive groove is formed at a position where the first lens is connected to the spacing ring and the second barrel wall;
   wherein the spacing ring comprises a first surface extending from the image side surface thereof to an object side thereof and obliquely towards the second barrel wall, the second barrel wall comprises a second surface extending from the image side surface thereof to the object side and obliquely towards the spacing ring, the first surface and the second surface together form an adhesive dispensing groove; an object side surface of the bearing portion is provided with a plurality of grooves spaced from each other, and the plurality of grooves together forms a jagged adhesive receiving groove; and the adhesive dispensing groove and the adhesive receiving groove together form the adhesive groove.

2. The lens module as described in claim 1, wherein the image side surface of the spacing ring and the image side surface of the second barrel wall are coplanar.

3. The lens module as described in claim 1, wherein the adhesive groove is filled with a shadowless adhesive; ultraviolet light passes through the first lens to cure the shadowless adhesive, and the shadowless adhesive adheres and fixes the first lens to the spacing ring and the second barrel wall.

4. The lens module as described in claim 1, wherein the adhesive groove is filled with a shadowless adhesive; ultraviolet light passes through the first lens to cure the shadowless adhesive, and the shadowless adhesive adheres and fixed the first lens to the spacing ring and second barrel wall.

5. The lens module as described in claim 2, wherein the adhesive groove is filled with a shadowless adhesive; ultraviolet light passes through the first lens to cure the shadowless adhesive, and the shadowless adhesive adheres and fixes the first lens to the spacing ring and the second barrel wall.

\* \* \* \* \*